US012611976B2

(12) United States Patent
Mihara

(10) Patent No.: US 12,611,976 B2
(45) Date of Patent: Apr. 28, 2026

(54) HEAD REST

(71) Applicant: TACHI-S CO., LTD., Tokyo (JP)

(72) Inventor: Kazuhiro Mihara, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 124 days.

(21) Appl. No.: 18/666,491

(22) Filed: May 16, 2024

(65) Prior Publication Data

US 2024/0383390 A1 Nov. 21, 2024

(30) Foreign Application Priority Data

May 17, 2023 (JP) ................................. 2023-081652

(51) Int. Cl.
*B60N 2/803* (2018.01)
*B60N 2/894* (2018.01)
(52) U.S. Cl.
CPC ............. *B60N 2/803* (2018.02); *B60N 2/894* (2018.02)
(58) Field of Classification Search
CPC ................................ B60N 2/803; B60N 2/894
USPC ......................................................... 297/408
See application file for complete search history.

(56) References Cited

U.S. PATENT DOCUMENTS

| 5,531,505 | A | * | 7/1996 | Baetz | ..................... | B60N 2/847 |
| | | | | | | 297/408 X |
| 8,950,815 | B2 | * | 2/2015 | Wang | ..................... | B60N 2/815 |
| | | | | | | 297/391 |
| 10,703,241 | B2 | * | 7/2020 | Switalski | ............... | B60N 2/894 |
| 2001/0004167 | A1 | * | 6/2001 | Takeda | ................... | B60N 2/847 |
| | | | | | | 297/408 |
| 2021/0387555 | A1 | | 12/2021 | Sato et al. | | |

FOREIGN PATENT DOCUMENTS

JP 2021-194953 A 12/2021

* cited by examiner

*Primary Examiner* — Anthony D Barfield
(74) *Attorney, Agent, or Firm* — Paratus Law Group, PLLC

(57) ABSTRACT

A head rest includes: a stay supported by a seat back of a vehicle seat; and an accommodation member forming an accommodation space for accommodating a part of the stay, in which the accommodation member includes a first member, a second member, and third member, the first member and the second member being disposed side by side in a front-rear direction of the vehicle seat, and the third member covering a space between the first member and the second member, and in which the third member includes a pair of side surface portions and an upper surface portion, the pair of side surface portions being disposed side by side in a left-right direction of the vehicle seat, and the upper surface portion connecting end portions of the pair of side surface portions on an upper side of the vehicle seat.

8 Claims, 12 Drawing Sheets

HEAD REST

CROSS REFERENCE TO RELATED APPLICATIONS

This application claims priority to Japanese Patent Application No. 2023-081652 filed on May 17, 2023, the contents of which are incorporated herein by reference.

TECHNICAL FIELD

The present disclosure relates to a head rest.

BACKGROUND ART

JP2021-194953A describes a head rest in which a speaker is provided inside a main body configured by connecting a rear cover and a front cover.

An object of the present disclosure is to provide a head rest capable of improving durability while increasing a degree of freedom of design.

SUMMARY OF INVENTION

According to an aspect of the present disclosure, there is provided a head rest that includes: a stay supported by a seat back of a vehicle seat; and an accommodation member forming an accommodation space for accommodating a part of the stay. The accommodation member includes a first member, a second member, and third member, the first member and the second member being disposed side by side in a front-rear direction of the vehicle seat, and the third member covering a space between the first member and the second member. The third member includes a pair of side surface portions and an upper surface portion, the pair of side surface portions being disposed side by side in a left-right direction of the vehicle seat, and the upper surface portion connecting end portions of the pair of side surface portions on an upper side of the vehicle seat.

DESCRIPTION OF EMBODIMENTS

Figure 1:
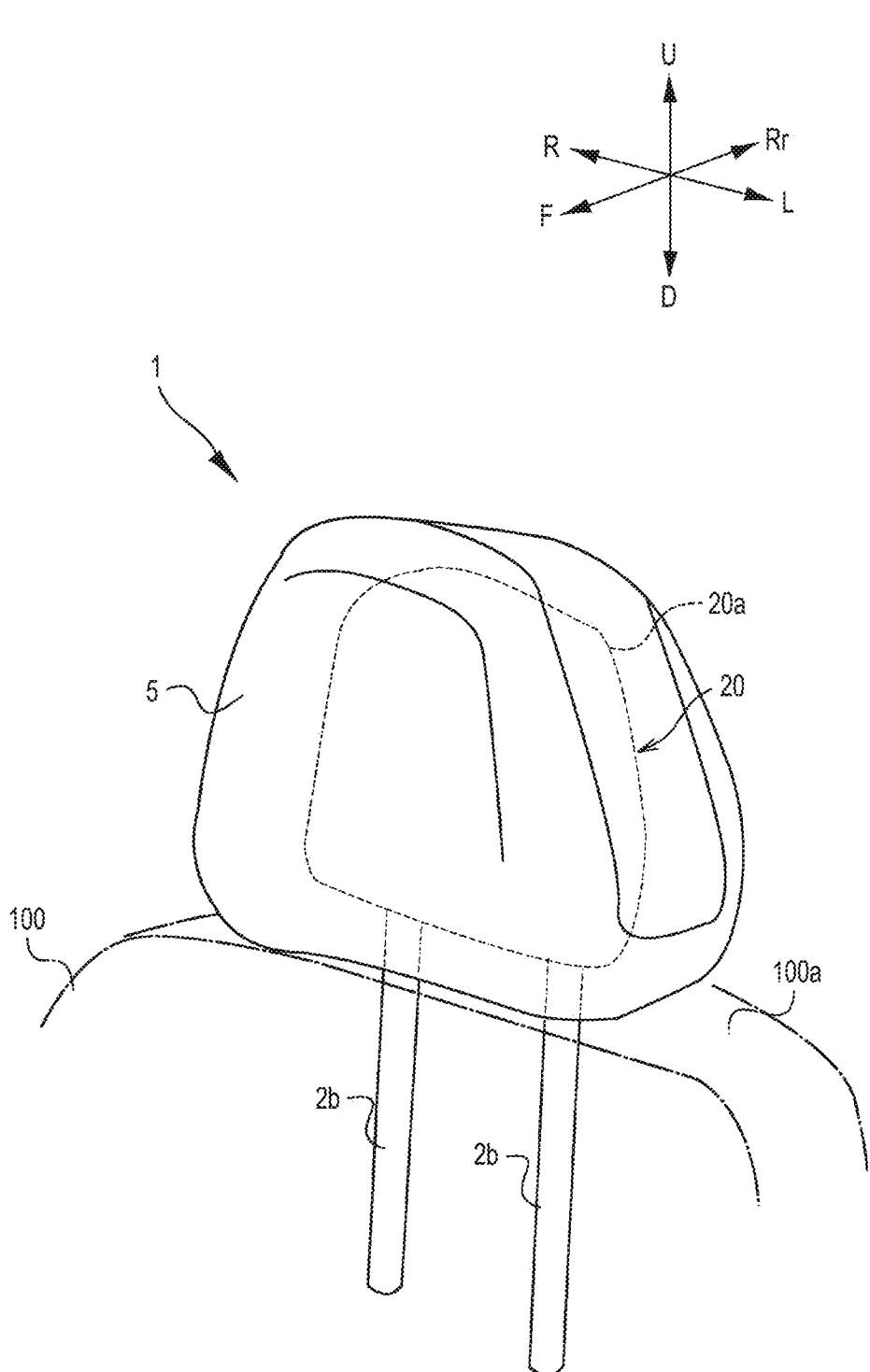
FIG. 1 is an external perspective view showing a schematic configuration of a head rest 1 according to an embodiment of the present disclosure.

FIG. 1 is an external perspective view showing a schematic configuration of a head rest 1 according to an embodiment of the present disclosure. In the following description, a front side of an occupant who sits in a normal posture on a vehicle seat to which a head rest 1 shown in FIG. 1 is attached is referred to as a frontward direction F, a direction opposite to the frontward direction F is referred to as a rearward direction Rr, and these directions are collectively referred to as a front-rear direction. A right side of the occupant when the occupant is viewed from a rear side is referred to as a rightward direction R, a left side of the occupant is referred to as a leftward direction L, and the left and right directions are collectively referred to as a left-right direction. A direction perpendicular to the front-rear direction and the left-right direction and extending from the head rest 1 toward a seating surface is referred to as a downward direction D, and a direction opposite to the downward direction D is referred to as an upward direction U. A front side surface of the head rest 1 is also referred to as a front surface, and a rear side surface of the head rest 1 is also referred to as a rear surface.

As shown in FIG. 1, the head rest 1 is connected to an upper end portion 100a of a seat back 100 of a vehicle seat and supports the rear of a head of an occupant. Examples of the vehicle include an automobile, an aircraft, a train, and a ship. The head rest 1 includes a stay unit 20, a pad (not shown) disposed on a front side of the stay unit 20, and a skin 5 constituting an outer surface of the head rest 1.

Figure 2:
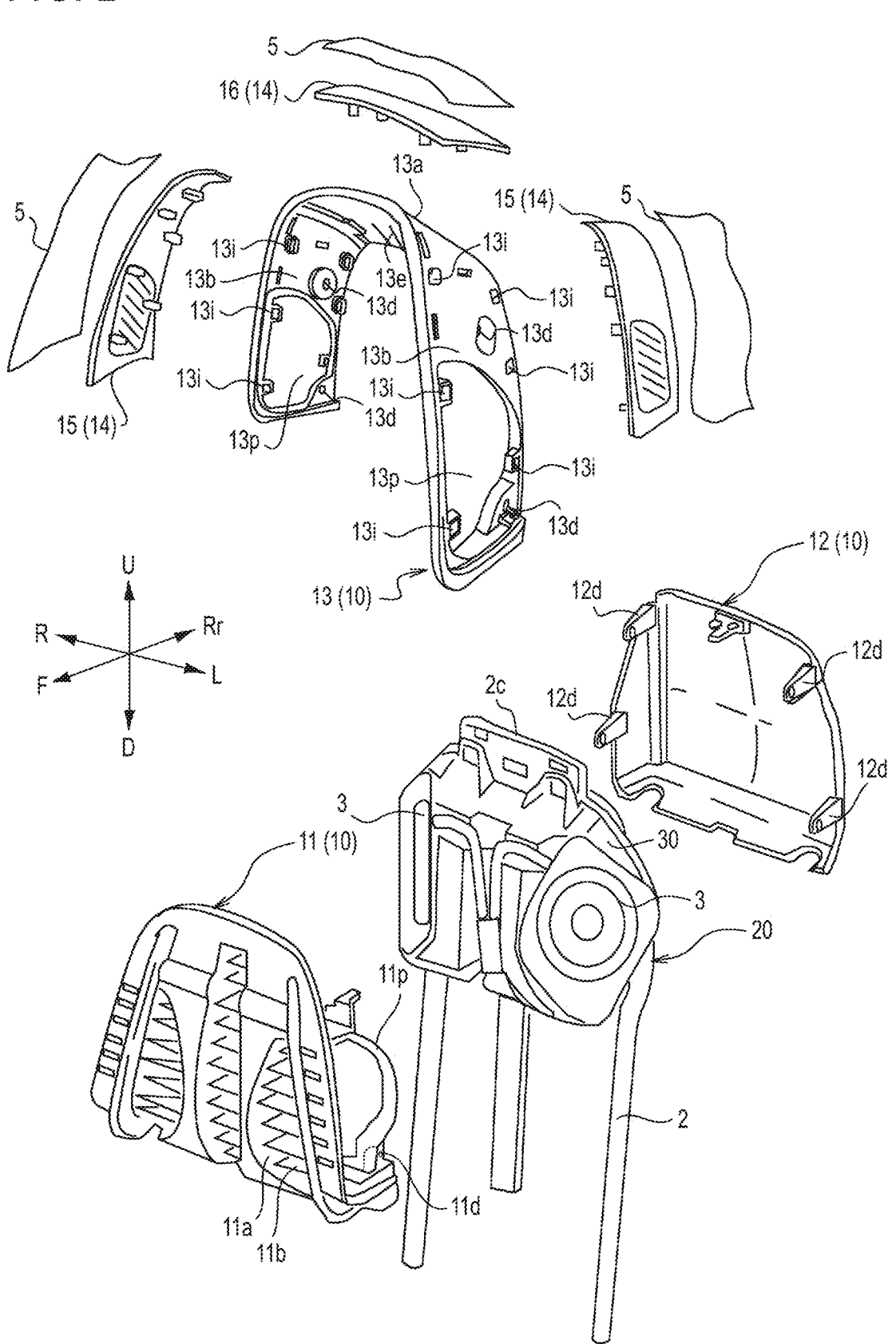
FIG. 2 is an exploded perspective view of the head rest 1 shown in FIG. 1.

FIG. 2 is an exploded perspective view of the head rest 1 shown in FIG. 1. FIG. 2 shows a state where the pad and the skin 5 are removed. As shown in FIG. 2, the stay unit 20 includes a stay 2, a speaker unit 30 including a pair of speakers 3 disposed side by side in the left-right direction, and a bracket 2c fixed to the stay 2. The speaker unit 30 is fixed to the bracket 2c. As shown in FIG. 1, the head rest 1 is attached to the seat back 100 by inserting a pair of leg portions 2b of the stay 2 into the upper end portion 100a of the seat back 100. An upper end portion 20a (see FIG. 1) of the stay unit 20 is accommodated in an accommodation member 10 to be described later. Front side and lower side portions of the accommodation member 10 are covered with pads serving as buffer members (not shown), and the entire thereof is covered with the skin 5 together with the pads.

As shown in FIG. 2, the accommodation member 10 includes a first member 11 and a second member 12 that are disposed side by side in the front-rear direction, and a third member 13 covering a space between the first member 11 and the second member 12. The head rest 1 includes a cover member 14 that covers the third member 13 of the accommodation member 10 and forms a part of the outer surface of the head rest 1.

Figure 3:
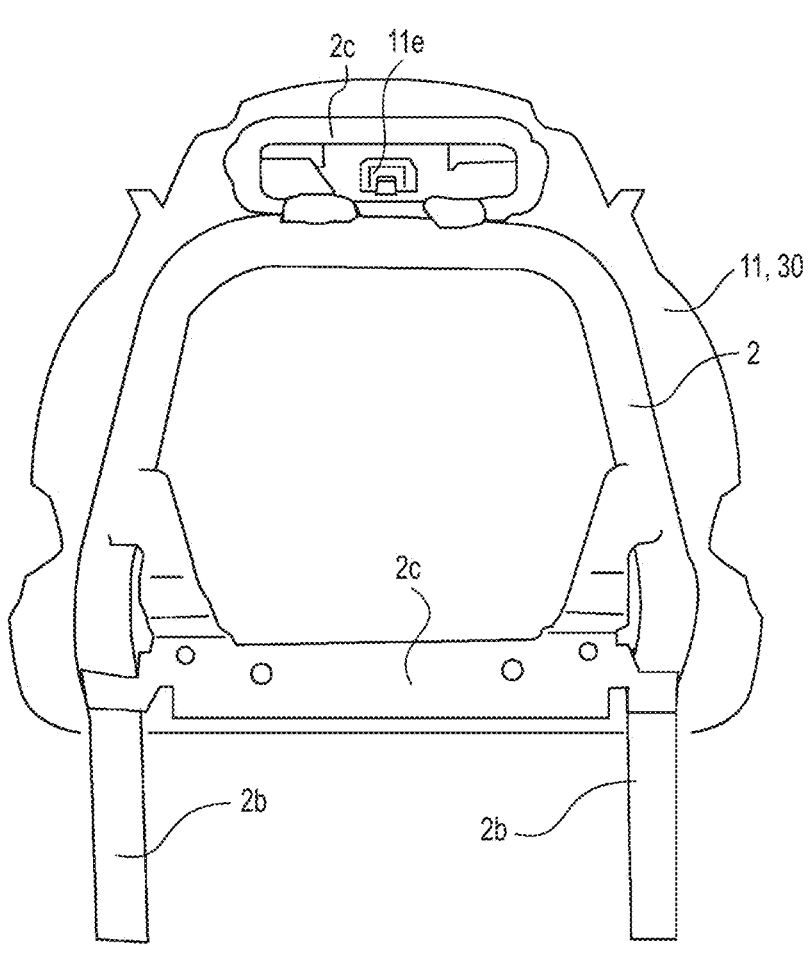
FIG. 3 is a view showing a state where a first member 11 is attached to a stay unit 20 shown in FIG. 2, as viewed from a rearward direction Rr.
Figure 4:
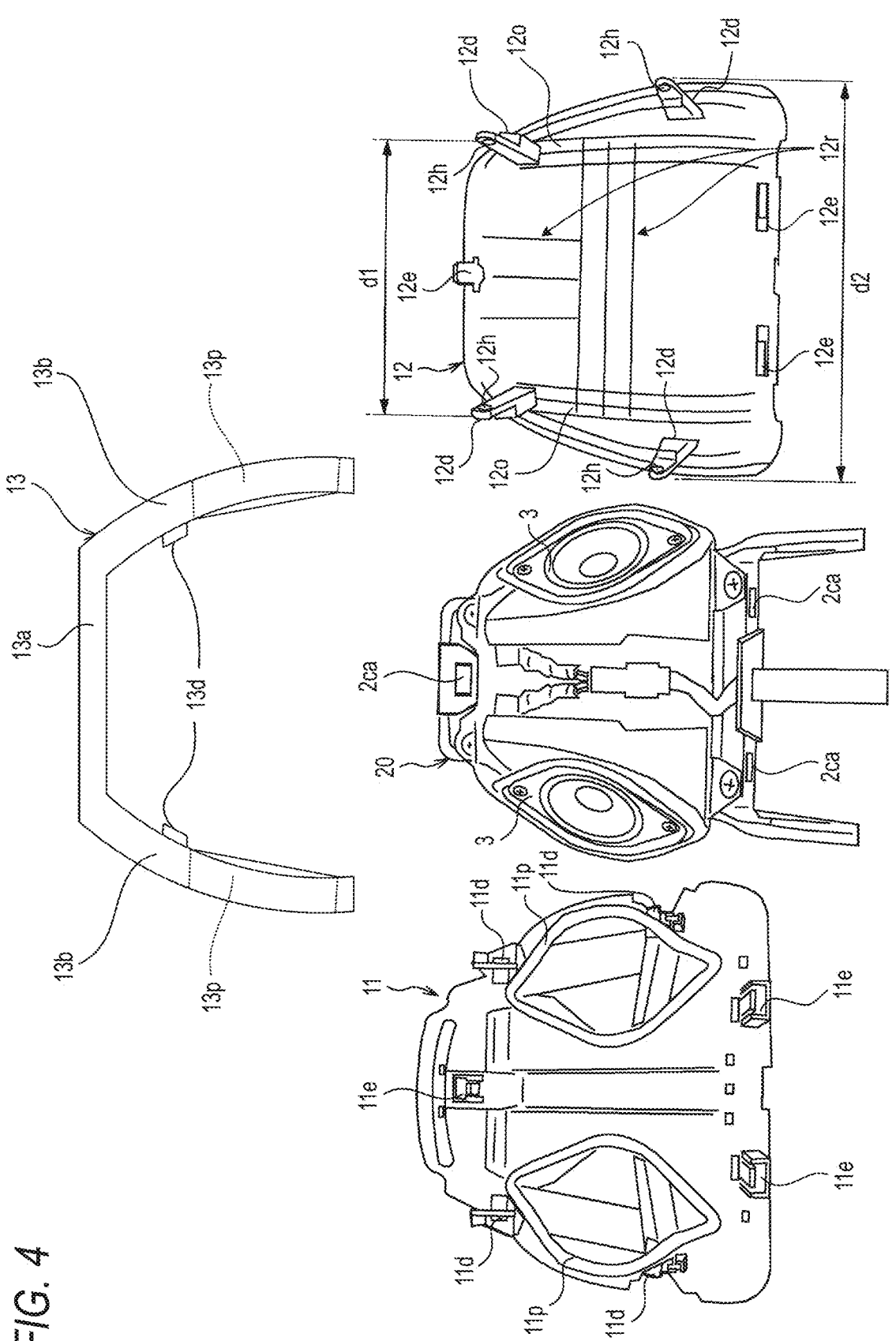
FIG. 4 is a view showing the stay unit 20, the first member 11, a second member 12, and a third member 13 shown in FIG. 2.

FIG. 3 is a view showing a state where the first member 11 is attached to the stay unit 20 shown in FIG. 2, as viewed from the rearward direction Rr. FIG. 4 is a view showing the stay unit 20, the first member 11, the second member 12, and the third member 13 shown in FIG. 2. In FIG. 4, the first member 11 is viewed from the rearward direction Rr. In FIG. 4, the stay unit 20, the second member 12, and the third member 13 are viewed from the frontward direction F.

As shown in FIG. 3, the stay 2 has an inverted U-shape, and is formed of, for example, a metal frame. For example, a metal bracket 2*c* is fixed to an upper end of the stay 2 and the vicinity of a base end portion of the leg portion 2*b*. The bracket 2*c* is separate from the stay 2, and may be integrated with the stay 2.

As shown in FIG. 4, a rear side surface of the first member 11 is provided with frame-shaped speaker pads 11*p* provided corresponding to the pair of speakers 3, a total of four fixing portions 11*d* respectively disposed on left and right end portions at an upper side and left and right end portions at a lower side, and a total of three fixing portions 11*e* including a fixing portion 11*e* disposed at the center in the left-right direction of an upper end portion and two fixing portions 11*e* disposed on a lower end portion. In the present specification, the fixing portion refers to a portion fixed to another component by adhesion, welding, screwing, fitting, engagement, or the like. In the example of FIG. 4, the fixing portions 11*d* and the fixing portions 11*e* are provided to protrude in the rearward direction Rr from the rear side surface of the first member 11. Each of the fixing portions 11*d* may have, for example, a structure in which an opening portion 11*h* (see FIG. 6) that opens toward a side opposite to a stay unit 20 side is provided in a portion protruding in the rearward direction Rr from the rear side surface of the first member 11. The fixing portion 11*d* is disposed outside the speaker pad 11*p*.

In order to reduce the weight and improve the strength of the first member 11, as shown in FIG. 2, a recessed portion 11*a* in which a rib 11*b* is formed inside is preferably provided on a front surface of the first member 11. In addition, in order to reduce the weight and improve the strength of the first member 11, recessed portions in which a rib is formed inside are preferably provided on left and right side surfaces of the first member 11.

As shown in FIG. 4, a front side surface of the second member 12 is provided with a total of four fixing portions 12*d* fixed to the four fixing portions 11*d* of the first member 11, and three fixing portions 12*e* fixed to the three fixing portions 11*e* of the first member 11 via the bracket 2*c*. In the example of FIG. 4, the fixing portions 12*d* and the fixing portions 12*e* are provided to protrude in the frontward direction F from the front side surface of the second member 12. Each of the fixing portion 12*d* may have, for example, a structure in which a screw hole 12*h* (see FIG. 6) penetrating in the left-right direction is provided in a portion protruding in the frontward direction F from the front side surface of the second member 12.

As shown in FIG. 4, the front side surface of the second member 12 is preferably provided with ribs 12*r* (in the example shown in FIG. 4, there are a total of six ribs 12*r*, three ribs 12*r* extend up and down, and three ribs 12*r* extend left and right) disposed at positions facing the stay 2 and the bracket 2*c* of the stay unit 20. Although the outer surface of the second member 12 is covered with the skin 5, a depression 120 for accommodating a seam allowance of the skin 5 is preferably provided in the second member 12. In the second member 12, a distance d1 between the two fixing portions 12*d* on the upper side is smaller than a distance d2 between the two fixing portions 12*d* on the lower side. In the first member 11, a distance between the two fixing portions 11*d* on the upper side is also smaller than a distance between the two fixing portions 11*d* on the lower side. Since a load is easily applied to the head rest 1 in the vicinity of the upper end portion, it is possible to improve the strength of the first member 11, the second member 12, and the third member 13 by narrowing an interval of the fixing portions on the upper side as described above.

As shown in FIG. 4, the bracket 2*c* of the stay unit 20 is provided with a total of three hole portions 2*ca* fixed to the three fixing portions 11*e* of the first member 11. The convex fixing portions 11*e* are press-fitted into the three hole portions 2*ca*, and the fixing portions 12*e* of the second member 12 are connected to the inside of the fixing portions 11*e*, so that the upper end portion 20*a* of the stay unit 20 is sandwiched between the first member 11 and the second member 12. In this state, a front surface, a rear surface, and a lower surface of the upper end portion 20*a* of the stay unit 20 are covered with the first member 11 and the second member 12, and left and right side surfaces and an upper surface of the upper end portion 20*a* are exposed. That is, in this state, a space defined by the first member 11 and the second member 12 is open in the leftward direction L, the upward direction U, and the rightward direction R.

The third member 13 covers an open portion of the space defined by the first member 11 and the second member 12. As shown in FIGS. 2 and 4, the third member 13 includes a pair of side surface portions 13*b* disposed side by side in the left-right direction, and an upper surface portion 13*a* connecting end portions of the pair of side surface portions 13*b* on an upper side. The third member 13 has an inverted U shape when viewed in the front-rear direction. Speaker openings 13*p* corresponding to the left and right speakers 3 are provided in the side surface portions 13*b* of the third member 13. A peripheral edge portion of the speaker opening 13*p* on an inner surface of the third member 13 protrudes toward the stay unit 20, and the protruding portion is fitted to the speaker pad 11*p* of the first member 11. Accordingly, in a state where the first member 11, the second member 12, and the third member 13 are attached to the stay unit 20, the sound from the speaker 3 can be favorably output through the speaker pad 11*p* and the speaker opening 13*p*.

As shown in FIG. 2, the cover member 14 includes two first cover members 15 attached to the pair of side surface portions 13*b* and covering the side surface portions 13*b*, and a second cover member 16 attached to the upper surface portion 13*a* and covering the upper surface portion 13*a*. The skin 5 is attached to outer surfaces of the first cover members 15 and the second cover member 16. The skin 5 is not essential and may be omitted. In this embodiment, although not particularly limited, when viewed in the front-rear direction, the third member 13 has a line-symmetrical configuration with, as a symmetric axis, a straight line passing through the center in the left-right direction and extending in the up-down direction. Therefore, the two first cover members 15 are line-symmetric with respect to the symmetric axis. Details will be hereinafter described, but end portions of the first cover members 15 on an upper surface portion 13*a* side extend onto the upper surface portion 13*a* and are disposed between the second cover member 16 and the upper surface portion 13*a*. That is, the first cover members 15 and the second cover member 16 are attached to the third member 13 in a state where the first cover members 15 are pressed against the upper surface portion 13*a* by the second cover member 16.

In the example shown in FIG. 2, six first engagement hole portions 13*i* that engage with first engagement claw portions 15*j* (see FIG. 7) (to be described later) provided on surfaces of the first cover members 15 on a third member 13 side are provided along front end edges and rear end edges of the side surface portions 13*b* of the third member 13. The side surface portions 13*b* of the third member 13 are provided with two fixing portions 13d fixed to the fixing portions 11d of the first member 11 and the fixing portions 12d of the second member 12. In the example of FIG. 2, the two fixing portions 13d are disposed side by side vertically with the speaker opening 13p interposed therebetween. Each of the fixing portions 13d includes, for example, a screw hole 13dh (see FIG. 6) formed in the side surface portion 13b and penetrating in the left-right direction and a peripheral portion of the screw hole 13dh.

Figure 5:
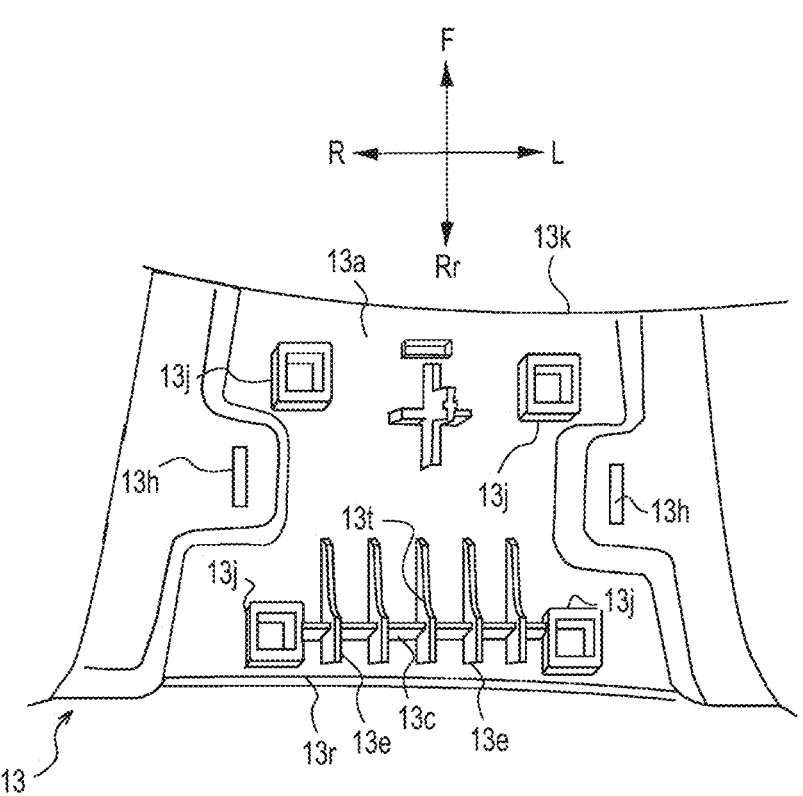
FIG. 5 is a bottom view of an upper surface portion 13a of the third member 13.

FIG. 5 is a bottom view of the upper surface portion 13a of the third member 13. As shown in FIG. 5, protruding portions 13e that come into contact with the bracket 2c on an upper side of the stay unit 20 are provided on an inner surface of the upper surface portion 13a of the third member 13. Each of the protruding portions 13e has a shape extending along the front-rear direction, and in the shown example, five protruding portions 13e are provided side by side in the left-right direction. The five protruding portions 13e are connected in a skewered manner by a lateral rib 13c extending in the left-right direction. Second engagement hole portions 13j that are engaged with second engagement claw portions 16j (see FIG. 8) (to be described later) provided on a surface of the second cover member 16 on the third member 13 side are arranged in two rows along a front end edge and a rear end edges of the upper surface portion 13a. Left and right end portions of the lateral rib 13c are connected to wall surfaces of the two second engagement hole portions 13j arranged along the rear end edge of the upper surface portion 13a.

Each protruding portion 13e is provided with an inclined surface 13t. In a state where the third member 13 is attached to the first member 11 and the second member 12, the third member 13 is attached to be inclined such that a rear end edge 13r is disposed below a front end edge (see FIG. 2). In a state where the third member 13 is attached to the stay unit 20 to which the first member 11 and the second member 12 are attached, the bracket 2c and the inclined surfaces 13t of the protruding portions 13e of the third member 13 are in contact with each other. Accordingly, by the third member 13, a load applied to the upper surface portion 13a can be released to the stay 2 via the bracket 2c. Further, since the left and right end portions of the lateral rib 13c are connected to the wall surfaces of the second engagement hole portions 13j, the strength of the upper surface portion 13a can be improved.

Figure 6:
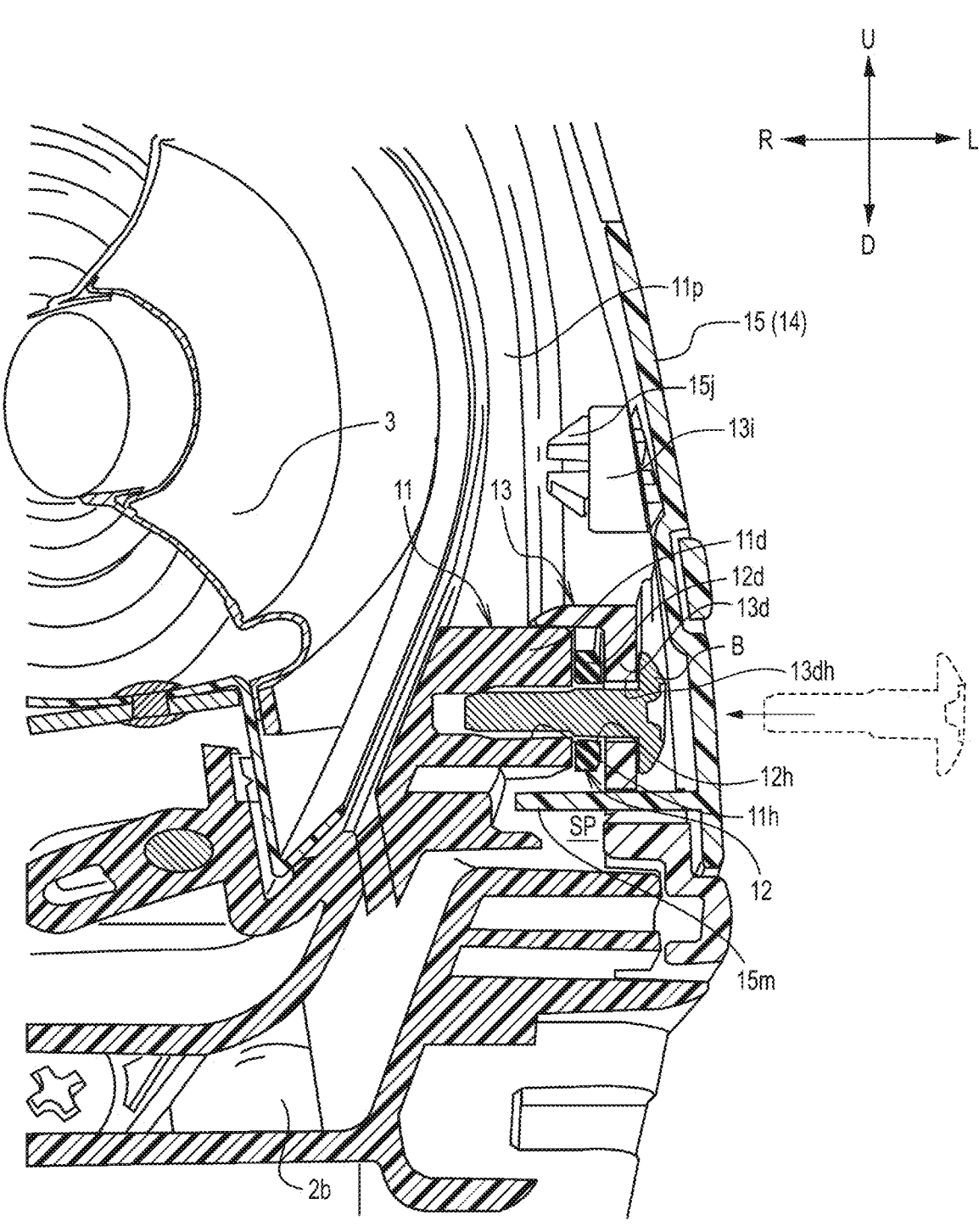
FIG. 6 is a main-part cross-sectional view of a fixing structure of the first member 11, the second member 12, and the third member 13.

FIG. 6 is a main-part cross-sectional view of a fixing structure of the first member 11, the second member 12, and the third member 13. FIG. 6 shows the fixing structure on a left lower side as viewed from a front side, and the other three fixing structures are the same, and the description thereof is omitted. The first member 11, the second member 12, the third member 13, and the stay unit 20 are assembled as follows. First, as shown in FIG. 3, the first member 11 is attached to the front side of the stay unit 20, and then the second member 12 is attached to a rear side of the stay unit 20. In this state, as shown in FIG. 6, the four fixing portions 11d of the first member 11 and the fixing portions 12d of the second member 12 corresponding to the four fixing portions 11d overlap each other in the left-right direction.

As shown in FIG. 2, lower sides of the fixing portions 11d of the first member 11 are provided adjacent to the speaker pads 11p, and frames of the speaker pads 11p exist on front sides. Accordingly, in order to prevent interference between the fixing portions 12d and the speaker pads 11p in a state where the fixing portions 11d and the fixing portions 12d overlap each other in the left-right direction, it is preferable to provide notches capable of receiving the fixing portions 12d in a region (a region indicated by a broken line in FIG. 2) of the speaker pads 11p corresponding to the fixing portions 12d.

After the first member 11 and the second member 12 are attached to the stay unit 20, the fixing portions 13d of the third member 13 are superposed from the outside on a portion where the fixing portions 11d and the fixing portions 12d overlap each other. The first member 11, the second member 12, and the third member 13 are fastened by passing screws B through the three fixing portions, that is, 11d, 12d, and 13d that overlap each other. In this way, the first member 11, the second member 12, and the third member 13 are firmly fixed to each other at two positions, that is, upper and lower positions in the left-right direction.

Figure 7:
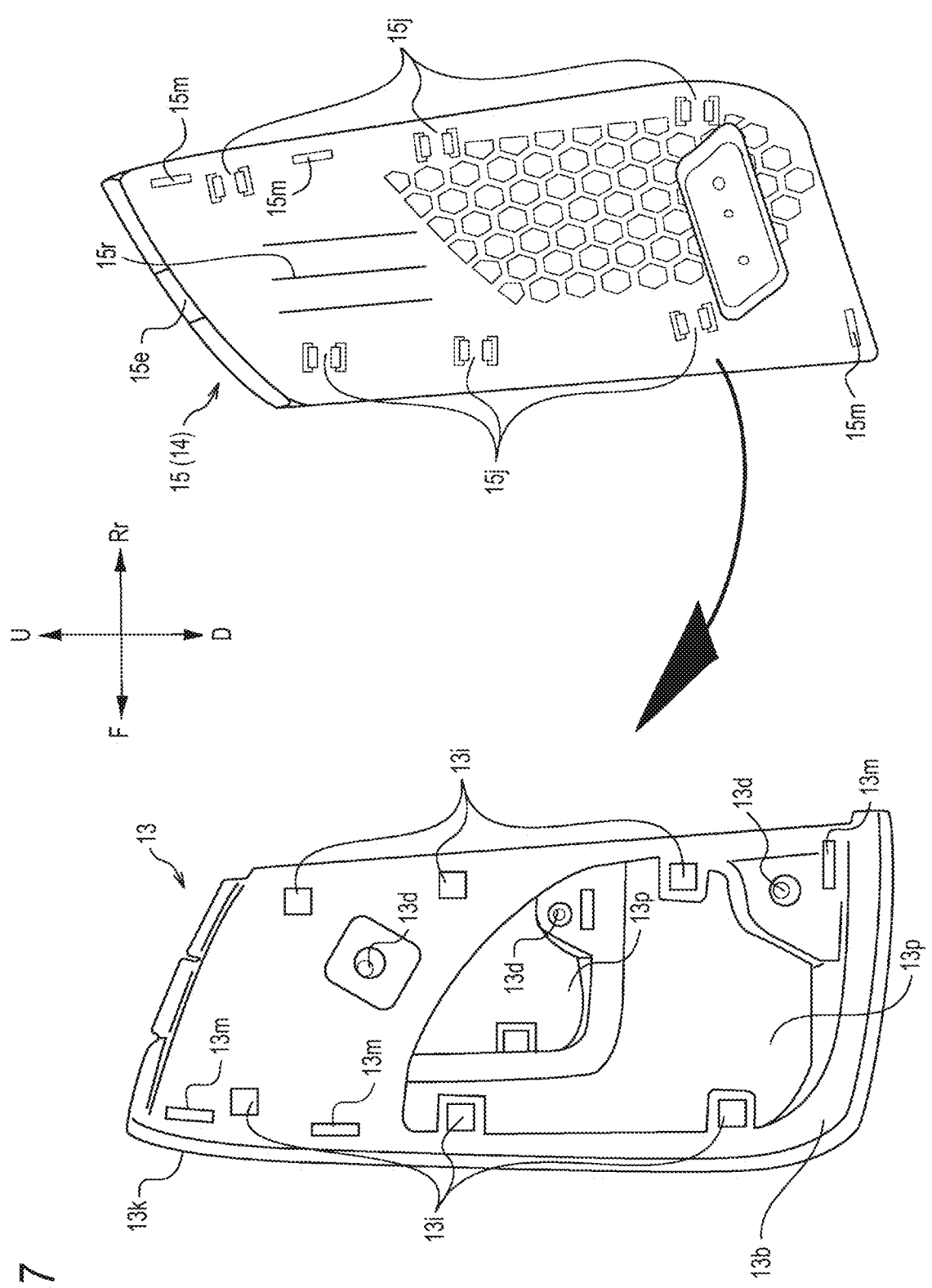
FIG. 7 is an exploded view showing a connection structure of a side surface portion 13b of the third member 13 and a first cover member 15.

FIG. 7 is an exploded view showing a connection structure of the side surface portion 13b of the third member 13 and the first cover member 15. FIG. 7 shows a surface (referred to as an inner surface) of the first cover member 15 on a third member 13 side. As shown in FIG. 7, six first engagement hole portions 13i are provided on the side surface portion 13b of the third member 13. On the other hand, six first engagement claw portions 15j that engage with the first engagement hole portions 13i are provided on the inner surface of the first cover member 15.

Further, the side surface portion 13b of the third member 13 is provided with, for example, three positioning hole portions 13m constituted by elongated holes extending along an outer peripheral edges 13k on a front side and a lower side. On the other hand, positioning protrusions 15m inserted into the positioning hole portions 13m are provided on the inner surface of the first cover member 15. The positioning hole portions 13m are provided at positions closer to the outer peripheral edge 13k than the first engagement hole portions 13i. Accordingly, a distance between an outer peripheral edge on a front side and a lower side of the first cover member 15 and the outer peripheral edge 13k of the third member 13 can be accurately held. Three ribs 15r extending in the up-down direction protrude from the inner surface of the first cover member 15. Accordingly, the first cover member 15 is reinforced.

As shown in FIG. 6, the first member 11 is provided with a space SP for accommodating the positioning protrusions 15m of the first cover member 15. Accordingly, the first cover member 15 can be held in the vicinity of a portion where the first member 11, the second member 12, and the third member 13 are fixed, and stable holding becomes possible.

Figure 8:
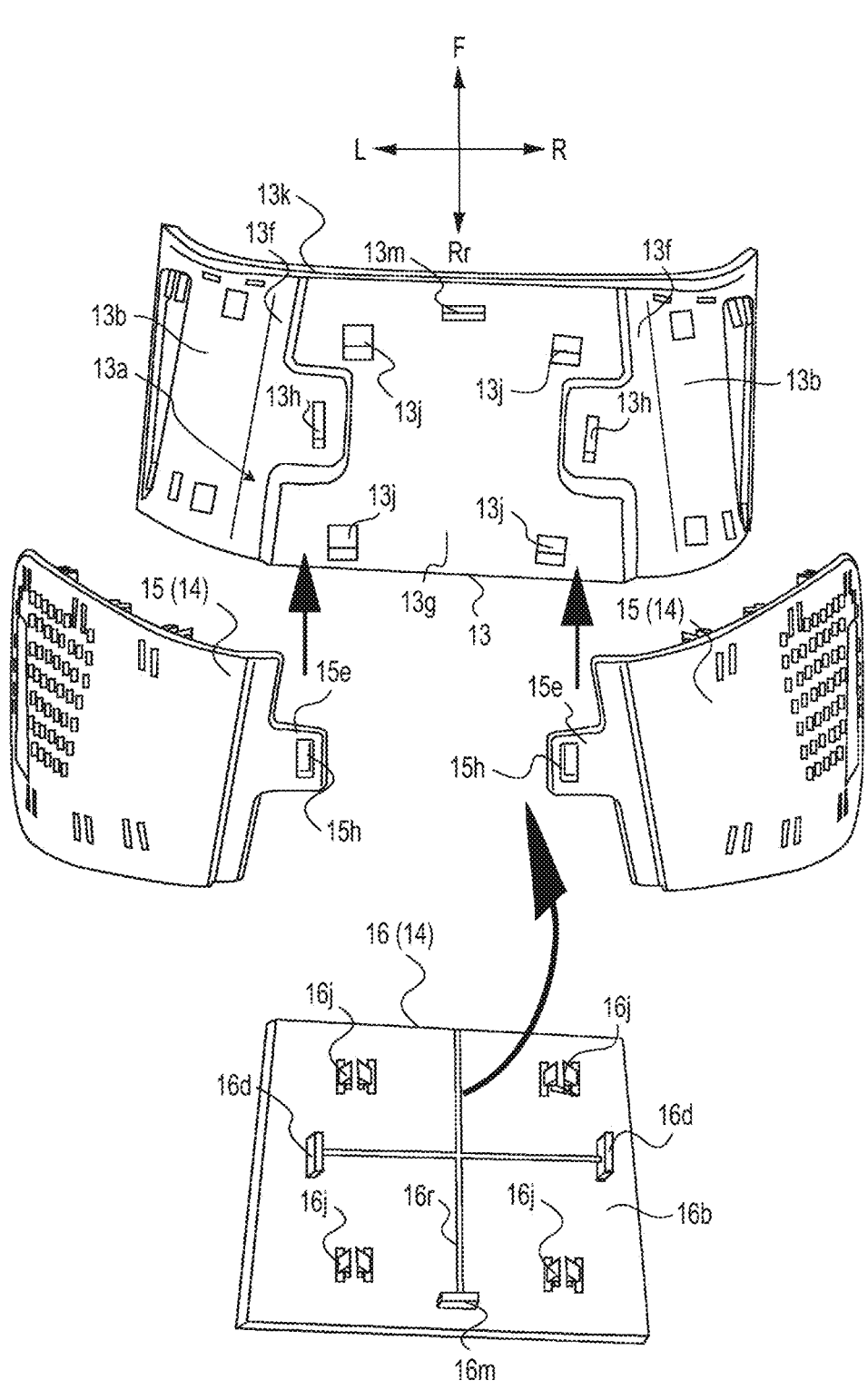
FIG. 8 is an exploded perspective view showing the third member 13 and a cover member 14.
Figure 9:
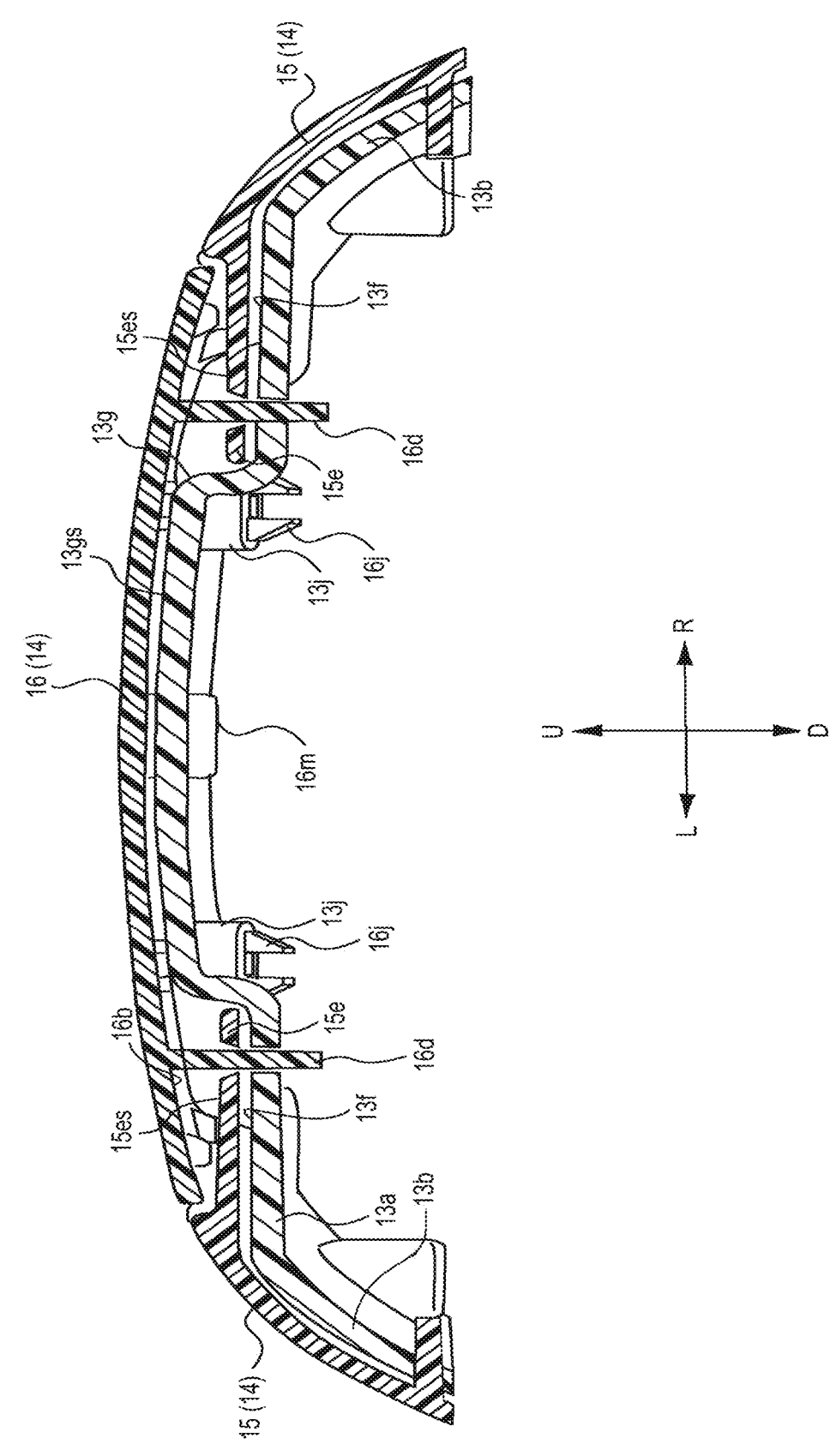
FIG. 9 is a main-part cross-sectional view in a state where the cover member 14 is attached to the third member 13.

FIG. 8 is an exploded perspective view showing the third member 13 and the cover member 14. FIG. 9 is a main-part cross-sectional view in a state where the cover member 14 is attached to the third member 13. As shown in FIG. 8, the upper surface portion 13a of the third member 13 is provided with, for example, one positioning hole portion 13m constituted by an elongated hole extending along the outer peripheral edge 13k on the front side, in addition to the four second engagement hole portions 13j. In the upper surface portion 13a, the positioning hole portion 13m is also provided at a position closer to the outer peripheral edge 13k than the second engagement hole portion 13j. Accordingly, a distance between an outer peripheral edge on a front side of the second cover member 16 and the outer peripheral edge 13k on the front side of the third member 13 can be accurately held.

As shown in FIG. 9, the upper surface portion 13a includes contact portions 13f that comes into contact with upper end portions 15e of the first cover member 15, and a step portion 13g that rises from the contact portions 13f toward the second cover member 16. That is, as shown in FIG. 8, when viewed from an upper side, the upper end portions 15e of the first cover member 15 correspond to the depressed contact portions 13f on both the left and right sides. The contact portion 13f is formed of, for example, a plane intersecting (preferably orthogonal to) the up-down direction. As shown in FIG. 8, the step portion 13g has a horizontal H shape in a top view, and the contact portions 13f are inserted in the left-right direction at a substantially center in the front-rear direction. The second engagement hole portions 13j and the positioning hole portion 13m are configured to penetrate the step portion 13g in the up-down direction. In the contact portions 13f of the third member 13, second hole portions 13h constituted by through holes are provided in an area sandwiched by the step portion 13g in the front-rear direction. First hole portions 15h constituted by through holes corresponding to the second hole portions 13h are provided on the upper end portions 15e of the first cover member 15.

A rear surface 16b of the second cover member 16 is provided with a pair of protrusions 16d inserted into the first hole portions 15h and the second hole portions 13h. In addition, the rear surface 16b of the second cover member 16 is provided with second engagement claw portions 16j that engage with the second engagement hole portions 13j and a positioning protrusion 16m that is inserted into the positioning hole portion 13m. A cross-shaped rib 16r connected to the protrusion 16m and connected to the two protrusions 16d projects from the rear surface 16b of the second cover member 16 between the protrusions 16d. Accordingly, the second cover member 16 is reinforced.

As shown in FIG. 9, the upper end portion 15e of the first cover member 15 on a second cover member 16 side is disposed between the upper surface portion 13a of the third member 13 and the second cover member 16. In the up-down direction, a position of the outer surface 15es of the upper end portion 15e of the first cover member 15 is lower than a position of the outer surface 13gs of the step portion 13g. Accordingly, the second cover member 16 is placed on the outer surface 13gs of the step portion 13g. A gap is formed between the outer surface 15es of the first cover member 15 and the rear surface 16b of the second cover member 16 to hide an end portion of the skin 5.

Figure 10:
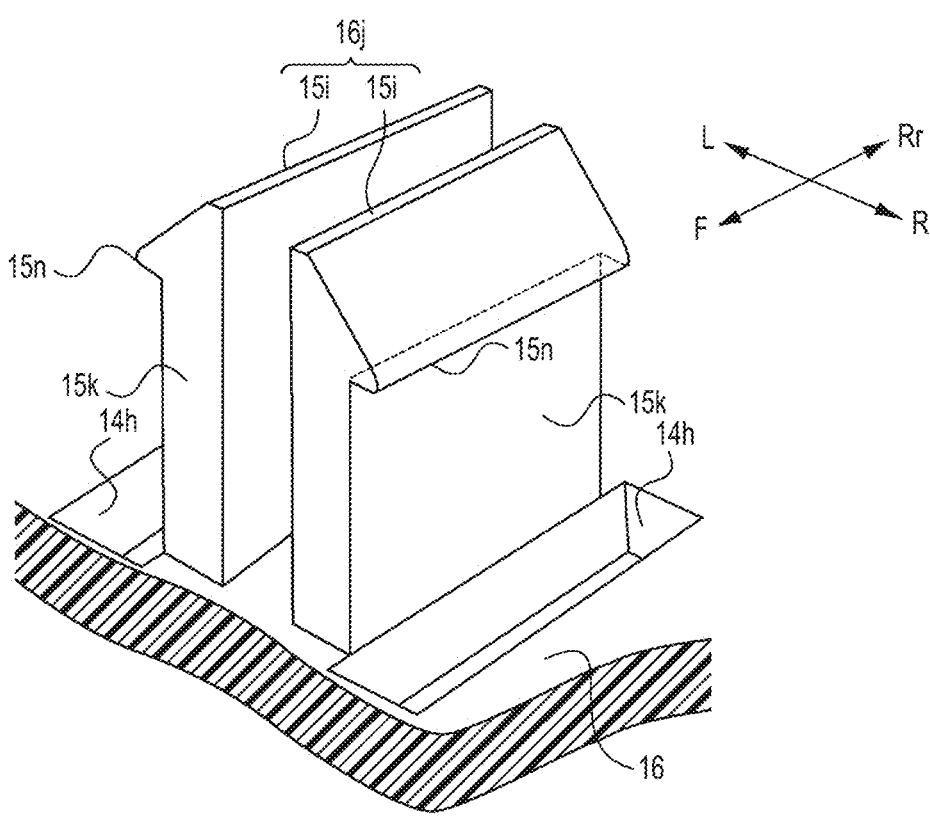
FIG. 10 is an enlarged perspective view showing a shape of a second engagement claw portion 16j.
Figure 11:
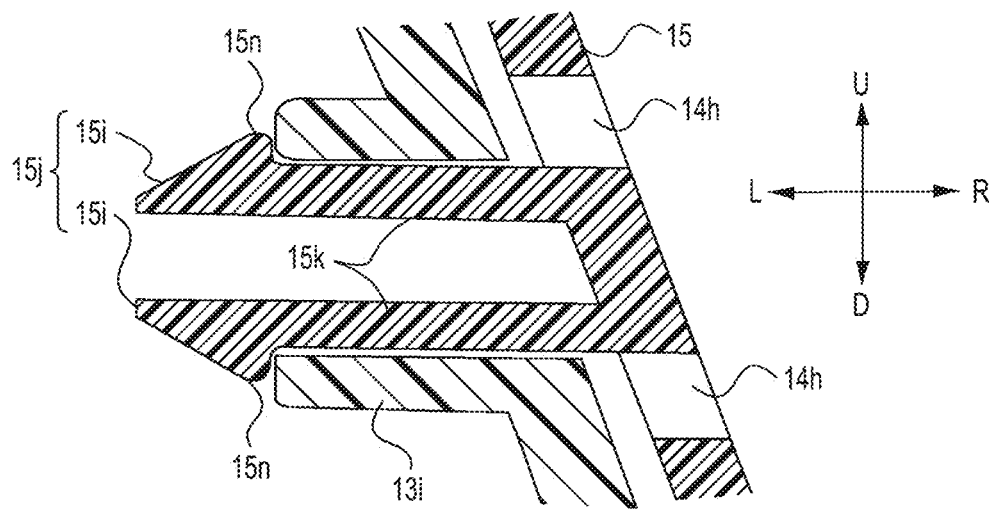
FIG. 11 is an enlarged cross-sectional view showing a shape of a first engagement claw portion 15j.

FIG. 10 is an enlarged perspective view showing a shape of the second engagement claw portion 16j. FIG. 11 is an enlarged cross-sectional view showing a shape of the first engagement claw portion 15j. As described above, the cover member 14 (including the first cover member 15 and the second cover member 16) is provided with the first engagement claw portions 15j and the second engagement claw portions 16j. As shown in FIG. 11, each first engagement claw portion 15j has a configuration in which a pair of standing leg portions 15k provided with claws 15i at tips are disposed side by side in the up-down direction to face each other. As shown in FIG. 10, each second engagement claw portion 16j has a configuration in which the pair of standing leg portions 15k provided with the claws 15i at tips are disposed side by side in the left-right direction to face each other. As shown in FIG. 11, each of the first engagement claw portion 15j and the second engagement claw portion 16j has a structure in which base end portions 15n of the claws 15i are engaged with inside portions of the first engagement hole portions 13i (the second engagement hole portions 13j). In order to form the pair of claws 15i, molding holes 14h are formed in the cover member 14 near the base ends of the standing leg portions 15k. When an outer surface of the cover member 14 is covered with the skin 5, it is preferable not to partially sink the skin 5 inside the molding holes 14h. By setting a size of each molding hole 14h to 3 mm×6 mm in plan view, it is possible to ensure the deflection of the claws 15i while preventing the sinking.

Figure 12:
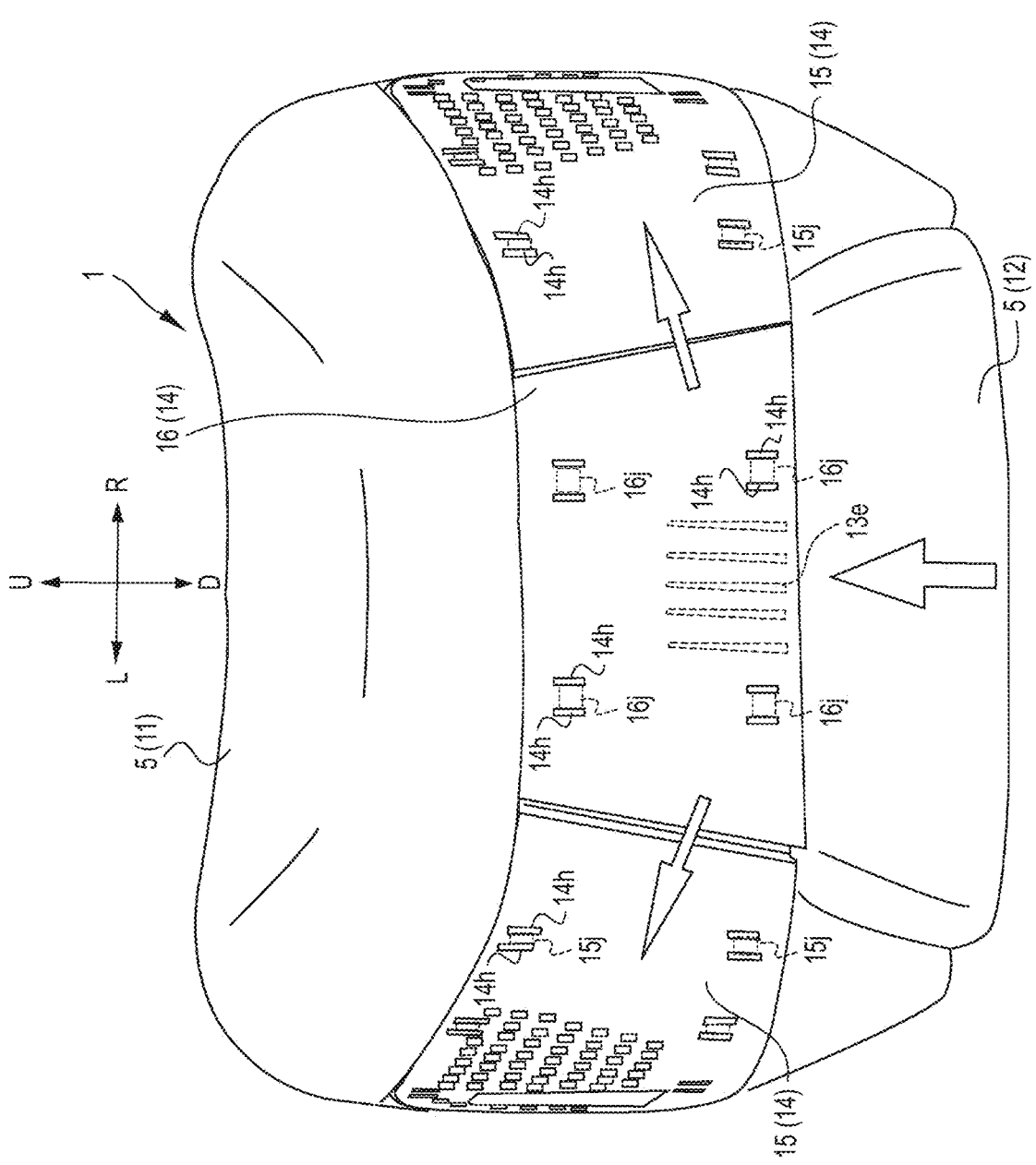
FIG. 12 is a top view of the cover member 14 connected to the third member 13.

FIG. 12 is a top view of the cover member 14 connected to the third member 13. FIG. 12 shows a state where the skin 5 of the cover member 14 is removed. As shown in FIG. 12, in the cover member 14, a pair of the first cover members 15 and the second cover member 16 are securely attached to the third member 13 by the above-described connection structure. That is, the cover member 14 is connected to the third member 13 by 16 engagement claw portions (the first engagement claw portions 15j and the second engagement claw portions 16j) on the left and right sides and an upper surface side.

As shown in FIG. 12, all of the 16 engagement claw portions are disposed along the front-rear direction of the vehicle seat, and the rigidity in the front-rear direction is high. Further, the protruding portions 13e that come into contact with the bracket 2c are provided on a rear surface side of the second cover member 16. Accordingly, an impact from the rear can be dispersed in the left-right direction.

In the embodiment described above, the cover member 14 is divided into three members, but the present disclosure is not limited thereto. For example, the first cover members 15 and the second cover member 16 may be integrated into one structure. In a case where the cover member 14 is divided into three members, it is necessary to engage each of the three members with the third member 13, so the number of molding holes 14h tends to increase. Therefore, by setting the size of the molding hole 14h as described above, the durability and the designability of the skin 5 can be improved.

As described above, according to the head rest 1, the accommodation member 10 includes the first member 11, the second member 12, and the third member 13, and the third member 13 includes the pair of side surface portions 13b and the upper surface portion 13a. Therefore, for example, by partially exposing the outer peripheral edge 13k on the front side and the lower side of the third member 13 to the outer surface, a seamless decorative line extending from a right side surface of the head rest 1 to a left side surface via an upper surface can be realized by the third member 13. Since such a decorative line can be realized by the third member 13, the decorative line can be prevented from falling off when a force is applied to the decorative line from the outside. In this way, durability can be improved while the degree of freedom of design is increased.

According to the head rest 1, the accommodation member 10 can be formed by overlapping the fixing portions 11d of the first member 11 and the fixing portions 12d of the second member 12, then overlapping the fixing portions 13d of the third member 13 outside the above fixing portions, and fixing the three fixing portions by the screws B or the like. Therefore, manufacturing can be easily performed. When the skin 5 that covers at least one of the outer surfaces of the first member 11 and the second member 12 is provided, ends of the skin 5 can be disposed inside the accommodation member 10 by the third member 13. Accordingly, curling of the ends of the skin 5 can be prevented and durability can be improved. In addition, the designability can be improved.

According to the head rest 1, for example, when the upper surface portion 13a of the third member 13 is subjected to a load from the outside, the load can be released to the stay 2 via the protruding portions 13e provided on the inner surface of the upper surface portion 13a. Accordingly, durability can be improved even in a configuration in which the accommodation member 10 is divided into three members. Since the second cover member 16 is provided with the rib 16r (see FIG. 8), the load can be released by the rib 16r, and the durability can be improved.

According to the head rest 1, since the cover member is divided into three members, boundary lines between adjacent members can be one design, and the designability and the marketability can be improved.

According to the head rest 1, the upper end portions 15e of the first cover member 15, the upper surface portion 13a, and the second cover member 16 are connected by the protrusions 16d. Therefore, a positional deviation of the first cover member 15 and the second cover member 16 in an arrangement direction can be prevented, and the durability and designability can be improved. When the second cover member 16 is subjected to a load, the load can be released not only to the third member 13 but also to the first cover member 15, and the durability can be improved. Since the ends of the skin 5 provided on the upper end portions 15e of the first cover member 15 can be covered with the second cover member 16, boundaries between the first cover member 15 and the second cover member 16 can be finely formed.

According to the head rest 1, since the first engagement claw portions 15j are constituted by the pair of claws 15i disposed in the up-down direction, the first cover members 15 are slightly movable by a load in the up-down direction of the seat. However, since the upper end portions 15e of the first cover member 15 and the third member 13 are connected by the protrusions 16d of the second cover member 16, the movement of the first cover members 15 in the up-down direction of the seat is restricted. Therefore, the positional deviation between the first cover member 15 and the second cover member 16 can be prevented. The pair of claws 15i of the first engagement claw portions 15j are less likely to be deformed against a load in the front-rear direction of the seat to which a large load is easily applied. Accordingly, durability can be increased.

According to the head rest 1, the second engagement claw portions 16j of the second cover member 16 are less likely to be deformed against a load in the front-rear direction of the seat to which a large load is easily applied. Accordingly, durability can be increased.

Although one aspect of the head rest 1 has been described above, the head rest 1 is not limited to the shown one, and can be appropriately changed within the scope of the technical idea of the present disclosure. For example, the stay unit 20 includes the speaker unit 30, and the speaker unit 30 is not essential and may be omitted. Since the speaker unit 30 has a large size, the speaker unit 30 needs to be sandwiched and accommodated between the first member 11 and the second member 12. In the head rest having such restrictions, the technique of the present disclosure is particularly useful.

As described above, the following matters are disclosed in the present specification. In parentheses, corresponding components and the like in the above-described embodiment are shown, but the present invention is not limited thereto.

(1)

A head rest, including:

a stay (the stay 2) supported by a seat back (the seat back 100) of a vehicle seat; and an accommodation member (the accommodation member 10) forming an accommodation space for accommodating a part of the stay, in which the accommodation member includes a first member (the first member 11), a second member (the second member 12), and a third member (the third member 13), the first member (the first member 11) and the second member (the second member 12) being disposed side by side in a front-rear direction of the vehicle seat, and the third member (the third member 13) covering a space between the first member and the second member, and the third member includes a pair of side surface portions (the side surface portions 13b) and an upper surface portion (the upper surface portion 13a), the pair of side surface portions (the side surface portions 13b) being disposed side by side in a left-right direction of the vehicle seat, and the upper surface portion (the upper surface portion 13a) connecting end portions of the pair of side surface portions on an upper side of the vehicle seat.

According to (1), the accommodation member includes the first member, the second member, and the third member, and the third member includes the pair of side surface portions and the upper surface portion. Therefore, for example, by partially exposing one end edge or the other end edge or both end edges of the third member in the front-rear direction of the seat to the outer surface, a seamless decorative line extending from a right side surface of the head rest to a left side surface via an upper surface can be realized. Since such a decorative line can be realized by the third member, the decorative line can be prevented from falling off when a force is applied to the decorative line from the outside. In this way, durability can be improved while the degree of freedom of design is increased.

(2)

The head rest according to (1), in which the first member, the second member, and the third member each include a fixing portion fixed to each other, and the fixing portion (the fixing portion 13d) of the third member is disposed outside the accommodation space than the fixing portion (the fixing portion 11d) of the first member and the fixing portion (the fixing portion 12d) of the second member.

According to (2), the accommodation member can be formed by overlapping the fixing portion of the first member and the fixing portion of the second member, then overlapping the fixing portion of the third member outside the above fixing portions, and fixing the three fixing portions with screws or the like. Therefore, manufacturing can be easily performed. When the skin that covers at least one of the outer surfaces of the first member and the second member is provided, ends of the skin can be disposed inside the accommodation member by the third member. Accordingly, curling of the end of the skin can be prevented and durability can be improved. In addition, the designability can be improved.

(3)

The head rest according to (2), in which a protruding portion (the protruding portion 13e) contacting with the stay or a bracket (the bracket 2c) fixed to the stay is provided on an inner surface of the upper surface portion of the third member.

According to (3), for example, when the upper surface portion of the third member is subjected to a load from the outside, the load can be released to the stay via the protruding portion provided on the inner surface of the upper surface portion. Accordingly, durability can be improved even in a configuration in which the accommodation member is divided into three members.

(4)

The head rest according to any one of (1) to (3), further including:

a cover member (the cover member 14) covering the third member and forming a part of an outer surface.

According to (4), for example, by covering the third member with the cover member such that the third member is partially exposed, an exposed area of the third member can be made a decorative line. Since the third member can be used as the decorative line, the decorative line can be prevented from falling off when a force is applied to the decorative line from the outside.

(5)

The head rest according to (4), in which the cover member includes a pair of first cover members (the first cover member 15) covering the pair of side surface portions and a second cover member (the second cover member 16) covering the upper surface portion.

According to (5), since the cover member is divided into three members, boundary lines between adjacent members can be one design, and the designability and the marketability can be improved.

(6)

The head rest according to (5), in which an end portion (the upper end portion 15*e*) of the first cover member on a side near the second cover member is disposed between the upper surface portion of the third member and the second cover member.

According to (6), for example, by connecting the end portion of the first cover member, the upper surface portion of the third member, and the second cover member with a protrusion or the like, a positional deviation of the first cover member and the second cover member in an arrangement direction can be prevented, and the durability and designability can be improved. When the second cover member is subjected to a load, the load can be released not only to the third member but also to the first cover member, and the durability can be improved. Since the ends of the skin provided on the end portion of the first cover member can be covered with the second cover member, boundaries between the first cover member and the second cover member can be finely formed.

(7)

The head rest according to (6), in which the upper surface portion of the third member includes a contact portion (the contact portion 13*f*) and a step portion (the step portion 13*g*), the contact portion (the contact portion 13*f*) contacting with the end portion of the first cover member, and the step portion (the step portion 13*g*) being raised from the contact portion toward the second cover member.

According to (7), since an upper surface of the first cover member can be prevented from being located at a position higher than an upper surface of the step portion, the first cover member and the second cover member can be smoothly connected to each other, and the durability and designability can be improved by preventing the engagement at the boundaries.

(8)

The head rest according to (7), in which in an up-down direction of the vehicle seat, a position of an outer surface (the outer surface 15*es*) of the end portion of the first cover member is lower than a position of an outer surface (the outer surface 13*gs*) of the step portion.

According to (8), the first cover member and the second cover member can be smoothly connected and disposed by using a step between the outer surface of the end portion of the first cover member and the outer surface of the step portion of the third member. As a result, the engagement of the first cover member and the second cover member at the boundaries can be prevented, and the durability and designability can be improved.

(9)

The head rest according to (6), in which the end portion of the first cover member is provided with a first hole portion (the first hole portion 15*h*), the upper surface portion of the third member is provided with a second hole portion (the second hole portion 13*h*), and the second cover member includes a protrusion (the protrusion 16*d*) inserted into the first hole portion and the second hole portion.

According to (9), a positional deviation of the first cover member and the second cover member in an arrangement direction can be prevented, and the durability and designability can be improved. When the second cover member is subjected to a load, the load can be released not only to the third member but also to the first cover member, and the durability can be improved. Since the second cover member can cover the end of the skin provided on the end portion of the first cover member, the boundaries between the first cover member and the second cover member can be finely formed.

(10)

The head rest according to (9), in which the pair of side surface portion of the third member is provided with a first engagement hole portion (the first engagement hole portion 13*i*), the first cover member is provided with a first engagement claw portion (the first engagement claw portion 15*j*) that engages with the first engagement hole portion, and the first engagement claw portion is constituted by a pair of claws (the claws 15*i*) facing each other in an up-down direction of the vehicle seat.

According to (10), the first cover member is somewhat movable by a load in the up-down direction of the seat, but since the end portion of the first cover member and the third member are connected by the protrusion of the second cover member, movement of the first cover member in the up-down direction of the seat is restricted. Therefore, it is possible to prevent the positional deviation between the first cover member and the second cover member. Further, the pair of claws of the first engagement claw portion are less likely to be deformed against a load in the front-rear direction of the seat to which a large load is easily applied. Accordingly, the durability can be increased.

(11)

The head rest according to (10), in which the upper surface portion of the third member is provided with a second engagement hole portion (the second engagement hole portion 13*j*),

the second cover member is provided with a second engagement claw portion (the second engagement claw portion 16*j*) that engages with the second engagement hole portion, and the second engagement claw portion is constituted by a pair of claws (the claws 15*i*) facing each other in a left-right direction of the vehicle seat.

According to (11), the second engagement claw portion of the second cover member is less likely to be deformed against a load in the front-rear direction of the seat to which a large load is easily applied. Accordingly, the durability can be increased.

(12)

The head rest according to (4), in which the third member includes a positioning hole portion (the positioning hole portion 13*m*) and an engagement hole portion (the first engagement hole portion 13*i* and the second engagement hole portion 13*j*), the positioning hole portion (the positioning hole portion 13*m*) extending along an outer peripheral edge (the outer peripheral edge 13*k*), and the engagement hole portion (the first engagement hole portion 13*i* and the second engagement hole portion 13*j*) being provided at a position farther from the outer peripheral edge than the positioning hole portion, and the cover member is provided with a positioning protrusion (the protrusion 15*m* and the protrusion 16*m*) inserted into the positioning hole portion and an engagement claw portion (the first engagement claw portion 15*j* and the second engagement claw portion 16*j*) engaged with the engagement hole portion.

According to (12), since the outer peripheral edge of the cover member and the first member or the second member can be held close to each other at a constant distance, the designability can be improved.

What is claimed is:

1. A head rest, comprising:

a stay supported by a seat back of a vehicle seat; and an accommodation member forming an accommodation space for accommodating a part of the stay, wherein the accommodation member includes a first member, a second member, and third member, the first member and the second member being disposed side by side in a front-rear direction of the vehicle seat, and the third member covering a space between the first member and the second member, the third member includes a pair of side surface portions and an upper surface portion, the pair of side surface portions being disposed side by side in a left-right direction of the vehicle seat, and the upper surface portion connecting end portions of the pair of side surface portions on an upper side of the vehicle seat, the first member, the second member, and the third member each include a fixing portion fixed to each other the fixing portion of the third member is disposed outside the accommodation space than the fixing portion of the first member and the fixing portion of the second member, and a protruding portion contacting with the stay or a bracket fixed to the stay is provided on an inner surface of the upper surface portion of the third member.

2. A head rest, comprising:

a stay supported by a seat back of a vehicle seat; and an accommodation member forming an accommodation space for accommodating a part of the stay, wherein the accommodation member includes a first member, a second member, and third member, the first member and the second member being disposed side by side in a front-rear direction of the vehicle seat, and the third member covering a space between the first member and the second member, the third member includes a pair of side surface portions and an upper surface portion, the pair of side surface portions being disposed side by side in a left-right direction of the vehicle seat, and the upper surface portion connecting end portions of the pair of side surface portions on an upper side of the vehicle seat, the head rest further comprises a cover member covering the third member and forming a part of an outer surface, the cover member includes a pair of first cover members covering the pair of side surface portions and a second cover member covering the upper surface portion, and an end portion of the first cover member on a side near the second cover member is disposed between the upper surface portion of the third member and the second cover member.

3. The head rest according to claim 2, wherein the upper surface portion of the third member includes a contact portion and a step portion, the contact portion contacting with the end portion of the first cover member, and the step portion being raised from the contact portion toward the second cover member.

4. The head rest according to claim 3, wherein in an up-down direction of the vehicle seat, a position of an outer surface of the end portion of the first cover member is lower than a position of an outer surface of the step portion.

5. The head rest according to claim 2, wherein the end portion of the first cover member is provided with a first hole portion, the upper surface portion of the third member is provided with a second hole portion, and the second cover member includes a protrusion inserted into the first hole portion and the second hole portion.

6. The head rest according to claim 5, wherein the pair of side surface portions of the third member is provided with a first engagement hole portion, the first cover member is provided with a first engagement claw portion that engages with the first engagement hole portion, and the first engagement claw portion is constituted by a pair of claws facing each other in an up-down direction of the vehicle seat.

7. The head rest according to claim 6, wherein the upper surface portion of the third member is provided with a second engagement hole portion, the second cover member is provided with a second engagement claw portion that engages with the second engagement hole portion, and the second engagement claw portion is constituted by a pair of claws facing each other in a left-right direction of the vehicle seat.

8. The head rest according to claim 2, wherein the third member includes a positioning hole portion and an engagement hole portion, the positioning hole portion extending along an outer peripheral edge, and the engagement hole portion being provided at a position farther from the outer peripheral edge than the positioning hole portion, and the cover member is provided with a positioning protrusion inserted into the positioning hole portion and an engagement claw portion engaged with the engagement hole portion.

\* \* \* \* \*